3,069,412
N-AMINOAZETIDINE AND PREPARATION
THEREOF
Irving Melville Roberts, Alhambra, Calif., and David Horvitz, Cincinnati, Ohio, assignors, by mesne assignments, to FMC Corporation, New York, N.Y., a corporation of Delaware
No Drawing. Filed Aug. 15, 1958, Ser. No. 756,060
4 Claims. (Cl. 260—239)

The present invention relates to a novel chemical compound, N-aminoazetidine, and to a method for preparing the same.

The structural formula of the chemical compound of this invention may be represented as follows:

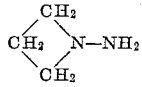

which is designated as N-aminoazetidine. The compound is a colorless liquid which boils at about 108°–109° C. under atmospheric pressure and freezes at about −24° C.

N-aminoazetidine is useful as a rocket propellant either alone as a monopropellant or in admixture with other materials. As a rocket fuel it may be burned with oxygen, nitric acid or any other conventional oxidizer. The compound is capable of producing a higher specific impulse than conventional fuels, since it has a high energy content due to the strained four-membered ring and the nitrogen-to-nitrogen bond in the compound. In addition, N-aminoazetidine has the added advantage of being hypergolic with nitric acid. The compound is also useful in the preparation of polymers and plastic materials, since it is readily polymerized either alone or with other monomers.

In accordance with one feature of this invention, N-aminoazetidine is prepared by either chemical or catalytic reduction of N-nitrosoazetidine. Various reduction processes may be employed, although the following methods are generally preferred.

(1) Catalytic reduction of N-nitrosoazetidine in the presence of hydrogen and a group VIII catalyst. The reaction is carrier out at a temperature of about 0° C. to 50° C. and a hydrogen pressure of about 50 to 2000 p.s.i.g. Palladium is a preferred catalyst and it may be employed either in an unsupported or a supported form.

(2) Reduction of N-nitrosoazetidine with aluminum in an alkaline solution. The reaction is carried out at a temperature of about 20° to 80° C. for a period of about 1 to 6 hours. Finely divided aluminum or coarse granules may be used, though the state of division of the particulated aluminum is not critical. Sodium hydroxide is the preferred alkaline material, although other alkali or alkaline earth hydroxides, as well as alkali or alkaline earth carbonates may be employed for this purpose. In general, the reaction is performed by dissolving the N-nitrosoazetidine in water and thereafter adding the aluminum metal and the alkaline solution.

(3) Reduction of N-nitrosoazetidine with lithium aluminum hydride in an ether solution. This method broadly comprises dissolving the N-nitrosoazetidine in ether, and while the temperature of this solution is maintained at its boiling temperature or lower, preferably 0° to 20° C., lithium aluminum hydride dissolved in ether is added. The resulting reaction mixture is stirred for an additional 1 to 4 hours.

The method employed to isolate the product varies with the reduction method that is used, and the exact method used is not related to the inventive aspects of the present processes. Fractional distillation is usually employed in order to obtain a pure product.

The N-nitrosoazetidine employed as the starting material in the above-described processes may be prepared by nitrosation of azetidine, utilizing either sodium nitrite and acetic acid (Howard, C. C. and Marckwald, W., Ber. 32, 2031–5; and Kohn, M., Ann. 351, 134–50) or an organic nitrite such as butyl nitrite. When using sodium nitrite an acid must be used to release the nitrous acid, but it must be a weak acid like acetic in order to avoid opening the azetidine ring or causing polymerization. The azetidine from which the N-nitrosoazetidine is prepared may be synthesized by reacting trimethylene bromide with p-toluene sulfonamide to give p-toluene sulfotrimethyleneimide, which is then reacted with sodium in amyl alcohol to give azetidine (Marckwald, W. and Van Droste Heulshoff, Ber. 31, 3261–6; and Howard, C. C. and Marckwald, W., supra).

The reduction processes employed to prepare the N-aminoazetidine will be more fully understood by reference to the following illustrative embodiments:

*Example 1*

A solution of 2.2 grams of N-nitrosoazetidine in 25 mls. of dry ether was cooled to 0° C. in an ice bath. One gram of lithium aluminum hydride was dissolved in 25 mls. of dry ether and this was added slowly to the stirred nitrosoamine solution with the temperature maintained below 10° C. After the addition was completed, the mixture was allowed to stir for one hour longer at 10° C. Finally, 20 mls. of wet ether were added, followed by 25 mls. of a saturated solution of potassium carbonate. The ether layer was withdrawn and the aqueous layer extracted with fresh ether which was combined with the first ether solution. Analysis of this solution indicated a 45% yield of N-aminoazetidine. The product was isolated from this solution by first drying the ether with potassium carbonate and then distilling in a fractionating column. Final purification was carried out by another distillation over barium oxide. Analysis for carbon: calcd., 49.97; found, 49.29 and for hydrogen: calcd., 11.18; found, 12.33.

*Example 2*

One gram of N-nitrosoazetidine was dissolved in 8 mls. of water. With the temperature maintained at 50° C., small portions of 5 mesh aluminum metal and 50% sodium hydroxide solution were added alternately over a period of one hour, until 0.5 gram of aluminum and 1.86 grams of 50% sodium hydroxide had been added. The solution was heated one hour longer at 50° C. Analysis of the resulting solution showed a 25.8% yield of N-aminoazetidine.

*Example 3*

Into a pressure vessel were placed 4.2 grams of crude N-nitrosoazetidine (containing 63.4% of the nitroso compound and the remainder azetidine), and 0.05 gram of 10% palladium on charcoal catalyst. The mixture was placed under 1700 p.s.i.g. of hydrogen for 2½ hours. Analysis of the resulting product showed a 22.4% yield of N-aminoazetidine.

The foregoing data show that the novel compound of this invention may be prepared by either chemical or catalytic reduction of N-nitrosoazetidine. The method shown in Example 3 is, however, preferred.

In accordance with another feature of this invention, a new route to azetidine has been discovered. The proposed method has the distinct advantage of providing better over-all yields than the conventional method described above. In general, the novel process comprises the selective reaction of 3-aminopropanol with sulfuric acid to produce 3-aminopropylsulfate, which is then reacted with caustic to give azetidine. More specifically, the 3-aminopropanol, dissolved in an inert solvent, such as water and the like, is reacted with a molar equivalent of sulfuric acid. The resulting reaction mixture is evaporated under reduced pressure such that the water can be removed at a temperature no higher than about 75° to 90° C. 3-hydroxypropylamine sulfate precipitates from the solution as white crystals. If purification of the amine sulfate is deemed necessary, it may be recrystallized from methanol. Quantitative yields of this compound can be obtained by further treatment of the mother liquors. The amine sulfate is next heated to a temperature of about 100° to 155° C. under high vacuum, i.e., 10 mm. or lower, the latter being preferred. In operation, it is desirable to remove the water by evaporation fast enough to keep the salt in a solid condition. The product recovered from the reaction vessel is 3-aminopropylsulfate. This step in the process has also been conducted under such conditions that the amine sulfate was melted during the heat treatment. Though the final product is the same, it was found that a longer period of time was required to remove the water from the melt and that the product, i.e., the 3-aminopropylsulfate, formed a hard cake which was difficult to remove from the reaction vessel. The two steps outlined above may be combined in one operation without isolation of the intermediate 3-hydroxypropylamine-sulfate.

The 3-aminopropylsulfate is next mixed with water and sodium hydroxide to form a slurry. This slurry is added to a sodium hydroxide solution (10 to 50%) heated to temperature of about 110° to 150° C. The addition of the slurry is preferably gradual with the recovery overhead of a distillate. The distillate is treated with sodium hydroxide to effect a phase separation. The upper layer is recovered and fractionated over sodium hydroxide to obtain the azetidine.

The production of azetidine in accordance with this method will be illustrated by the following embodiment:

*Example 4*

To 400 grams of 3-aminopropanol dissolved in 400 mls. of water was added a molar equivalent of sulfuric acid. This was then evaporated under reduced pressure while maintaining in a water bath at 75° C. When considerable reduction in volume had taken place, most of the product came out of solution as white crystals. Recrystallization from methanol and drying gave 735 grams of 3-hydroxypropylamine sulfate, having a melting point of 101° C. This represented an 80% yield. The 735 grams of amine sulfate were placed in a flask and a high vacuum applied. A bath temperature of 155° C. was maintained, but the evaporation of the water took place at a rate sufficient to keep the salt below its melting point of 101° C., and it remained solid throughout. In this particular reaction there were obtained 660 grams of 3-aminopropylsulfate (quantitative yield) with a melting point of 195°–214° C.

A slurry containing 168 grams of the 3-aminopropylsulfate, 97 grams of water and 258 grams of 50% aqueous sodium hydroxide was added slowly to 168 grams of 50% sodium hydroxide solution heated to 150° C. A distillate was taken off during the addition. The distillate was treated with solid sodium hydroxide until a layer separated on top. This layer was fractionated over solid sodium hydroxide to give azetidine boiling at 62°–63° C. and a yield of 8.9%.

The azetidine produced by the above-described process may be readily converted to the N-nitrosoazetidine by either of the methods previously described and then employed as a starting material for the production of N-aminoazetidine.

While certain specific embodiments of the invention have been described above, there is no intention to limit the invention to the particular procedures employed therein. The invention is obviously subject to modifications and variations without departing from its broader aspects.

What is claimed is:
1. N-aminoazetidine.
2. A process for producing N-aminoazetidine which comprises contacting N-nitrosoazetidine with particulated aluminum metal in a sodium hydroxide solution at a temperature of about 20° to 80° C., and recovering N-aminoazetidine from the resulting reaction product mixture.
3. A process for producing N-aminoazetidine which comprises contacting N-nitrosoazetidine with lithium aluminum hydride in the presence of ether at a temperature of about 0° to 20° C., and recovering N-aminoazetidine from the resulting reaction product mixture.
4. A process for producing N-aminoazetidine which comprises contacting N-nitrosoazetidine with hydrogen in the presence of palladium at a temperature of about 0° to 50° C., and recovering N-aminoazetidine from the resulting reaction product mixture.

References Cited in the file of this patent
UNITED STATES PATENTS

| | | |
|---|---|---|
| 2,955,108 | Omietanski | Oct. 4, 1960 |
| 2,955,112 | Jucker et al. | Oct. 4, 1960 |

OTHER REFERENCES

Briscoe: General Chem. for Colleges, pp. 112–115, 700–01 (1943), 4th ed., Riverside Press, Cambridge, Mass.

Elderfield: Heterocyclic Compounds, I, 666 (1950), J. Wiley & Sons, Inc.

Fieser et al.: Org. Chem., pp. 226–27 (1950), 2nd ed., D. C. Heath Co.

Reeves: Journal of the American Chemical Society, vol. 7, p. 3522 (1951).

Heine et al.: Journal of the American Chemical Society, vol. 75, pp. 2505–6 (1953).

Hewitt et al.: J.C.S. pp. 530–34 (at p. 532) (1953).